United States Patent
Tanaka et al.

(10) Patent No.: US 7,715,631 B2
(45) Date of Patent: May 11, 2010

(54) METHOD AND APPARATUS FOR EXTRACTING FEATURE INFORMATION, AND COMPUTER PRODUCT

(75) Inventors: Kazunari Tanaka, Kawasaki (JP); Isamu Watanabe, Kawasaki (JP); Hiroyuki Hatta, Kawasaki (JP); Nobuyuki Hiratsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1276 days.

(21) Appl. No.: 10/974,643

(22) Filed: Oct. 27, 2004

(65) Prior Publication Data

US 2006/0039607 A1 Feb. 23, 2006

(30) Foreign Application Priority Data

May 12, 2004 (JP) ............................. 2004-141985

(51) Int. Cl.
*G06K 9/46* (2006.01)
*G06F 7/00* (2006.01)

(52) U.S. Cl. .......................................... 382/190; 707/3
(58) Field of Classification Search ................. 382/190; 707/3

See application file for complete search history.

(56) References Cited

U.S. PATENT DOCUMENTS

| 5,619,410 | A  | * | 4/1997  | Emori et al. ..................... 704/7 |
| 5,649,193 | A  | * | 7/1997  | Sumita et al. ............ 707/103 R |
| 6,243,723 | B1 | * | 6/2001  | Ikeda et al. .................. 715/210 |
| 6,502,081 | B1 | * | 12/2002 | Wiltshire et al. .............. 706/12 |
| 7,028,026 | B1 | * | 4/2006  | Yang et al. ...................... 707/3 |
| 7,275,061 | B1 | * | 9/2007  | Kon et al. .................... 707/102 |
| 7,289,982 | B2 | * | 10/2007 | Saito et al. ...................... 707/3 |

FOREIGN PATENT DOCUMENTS

| JP | 10-040253  | 2/1998 |
| JP | 11-250097  | 9/1999 |
| JP | 2001-101199| 4/2001 |

* cited by examiner

*Primary Examiner*—Wenpeng Chen
(74) *Attorney, Agent, or Firm*—Greer, Burns & Crain, Ltd.

(57) ABSTRACT

An apparatus for extracting feature information from each of a plurality of electronic documents that constitutes a group of documents, for each of a plurality of viewpoints includes an extracting unit that extracts feature information from each of the electronic documents for each of the viewpoints, a calculating unit that calculates a score for each of the viewpoints with respect to the feature information that is extracted from more than one viewpoint, and a determining unit that determines the viewpoint for the feature information that is extracted from more than one viewpoint, based on the score calculated.

16 Claims, 7 Drawing Sheets

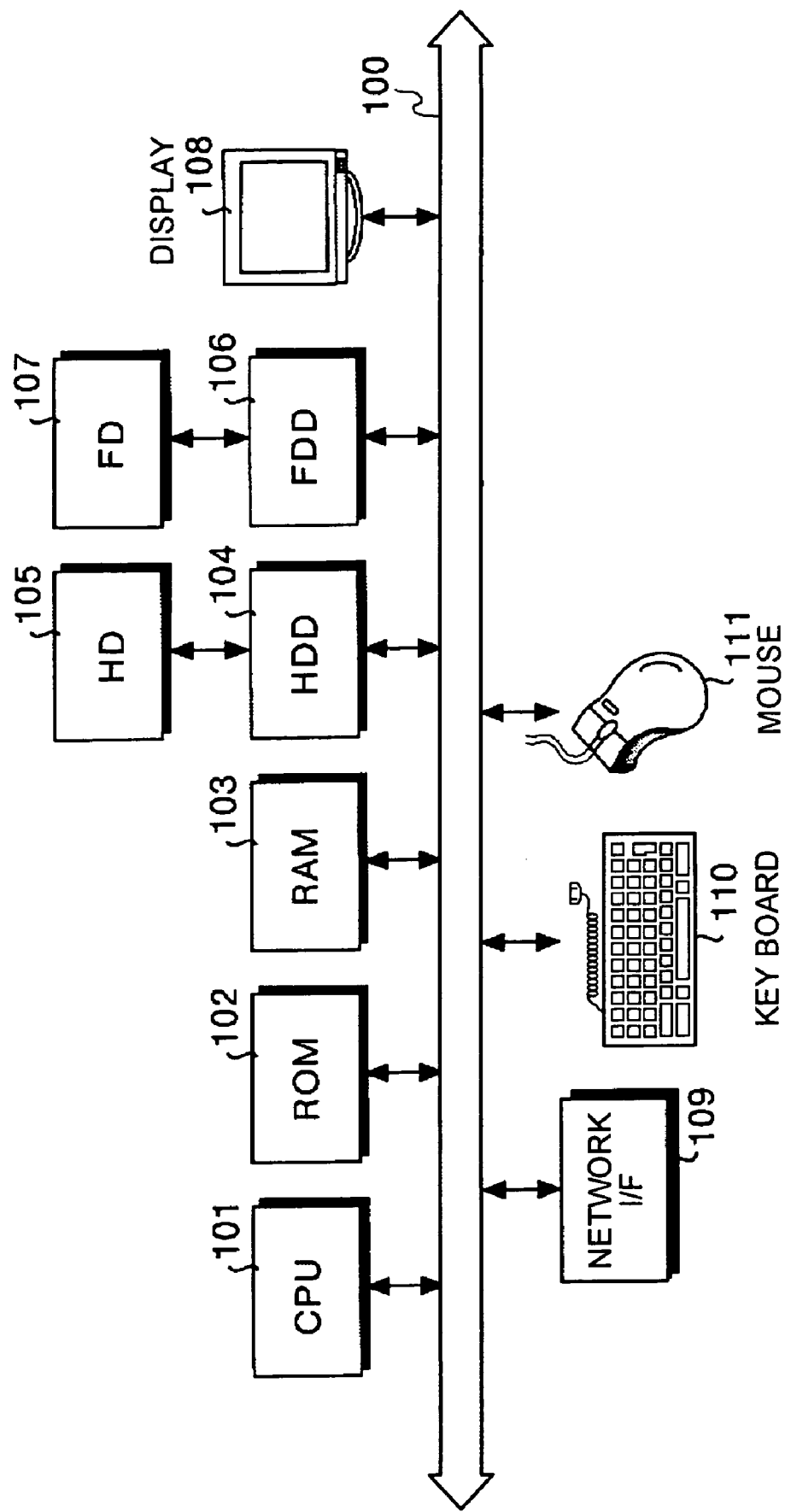

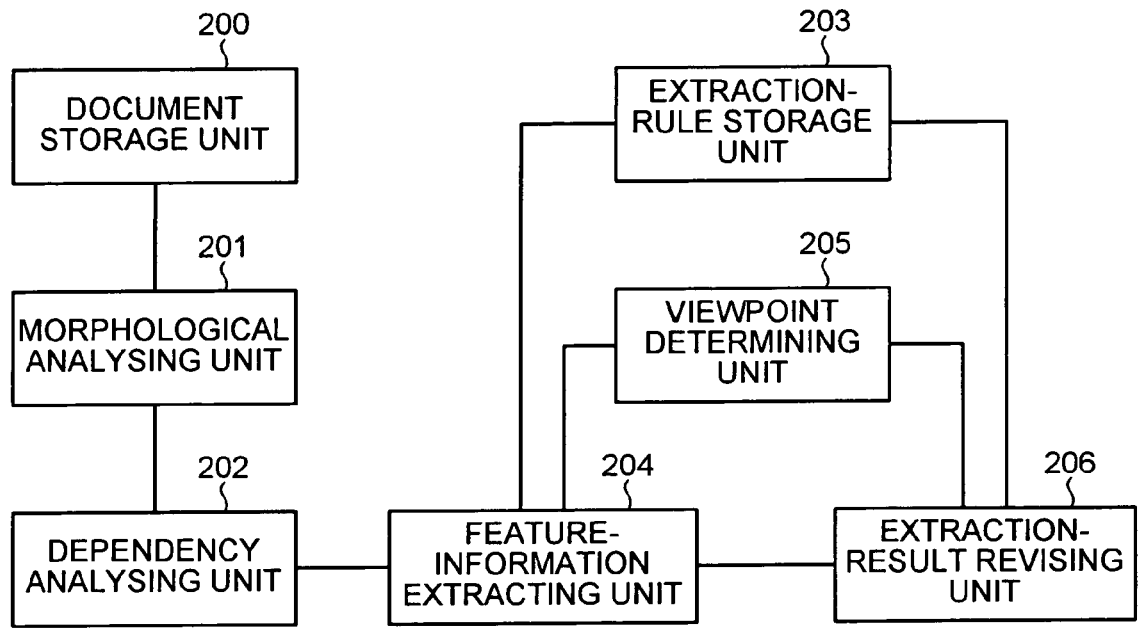

| VIEWPOINT | SCOPE | CHARACTER STRING | WEIGHT |
|---|---|---|---|
| SUBJECT MATTER OF INVENTION | FIELD OF THE INVENTION | AFTER "RELATED TO" | 1 |
| | | AFTER "ACCORDING TO" | 1 |
| | CLAIMS | BEFORE "CHARACTERIZED BY" | 3 |
| | TITLE OF THE INVENTION | "APPARATUS FOR..." | 3 |
| | | "METHOD OF..." | 3 |
| OBJECT | PROBLEMS TO BE SOLVED BY THE INVENTION | AFTER "IMPROVEMENT IN" | 2 |
| | | AFTER "ACHIEVING" | 4 |
| | | BEFORE "EASILY" | 3 |
| | ABSTRACT | AFTER "IMPROVEMENT IN" | 2 |
| | | AFTER "ACHIEVING" | 4 |
| | | BEFORE "EASILY" | 8 |

FIG.4

| DOCUMENT | VIEWPOINT | FEATURE INFORMATION |
|---|---|---|
| DOCUMENT A | SUBJECT MATTER OF INVENTION | VEHICLE DOOR |
| | OBJECT | ASSEMBLING EFFICIENCY |
| | | LIGHTENING |
| DOCUMENT B | SUBJECT MATTER OF INVENTION | SUSPENSION UNIT |
| | | ASSEMBLING EFFICIENCY |
| | OBJECT | ROADHOLDING CAPACITY |
| | | STABLE HANDLING |
| ⋮ | ⋮ | ⋮ |

FIG.5

| DOCUMENT | VIEWPOINT | FEATURE INFORMATION |
|---|---|---|
| DOCUMENT A | SUBJECT MATTER OF INVENTION | VEHICLE DOOR |
| | OBJECT | ASSEMBLING EFFICIENCY |
| | | LIGHTENING |
| DOCUMENT B | SUBJECT MATTER OF INVENTION | SUSPENSION UNIT |
| | OBJECT | ROADHOLDING CAPACITY |
| | | STABLE HANDLING |
| ⋮ | ⋮ | ⋮ |

FIG.6

| DOCUMENT | VIEWPOINT | FEATURE INFORMATION |
|---|---|---|
| DOCUMENT A | SUBJECT MATTER OF INVENTION | VEHICLE DOOR |
| | OBJECT | ASSEMBLING EFFICIENCY |
| | | LIGHTENING |
| DOCUMENT B | SUBJECT MATTER OF INVENTION | SUSPENSION UNIT |
| | OBJECT | ASSEMBLING EFFICIENCY |
| | | ROADHOLDING CAPACITY |
| | | STABLE HANDLING |
| ⋮ | ⋮ | ⋮ |

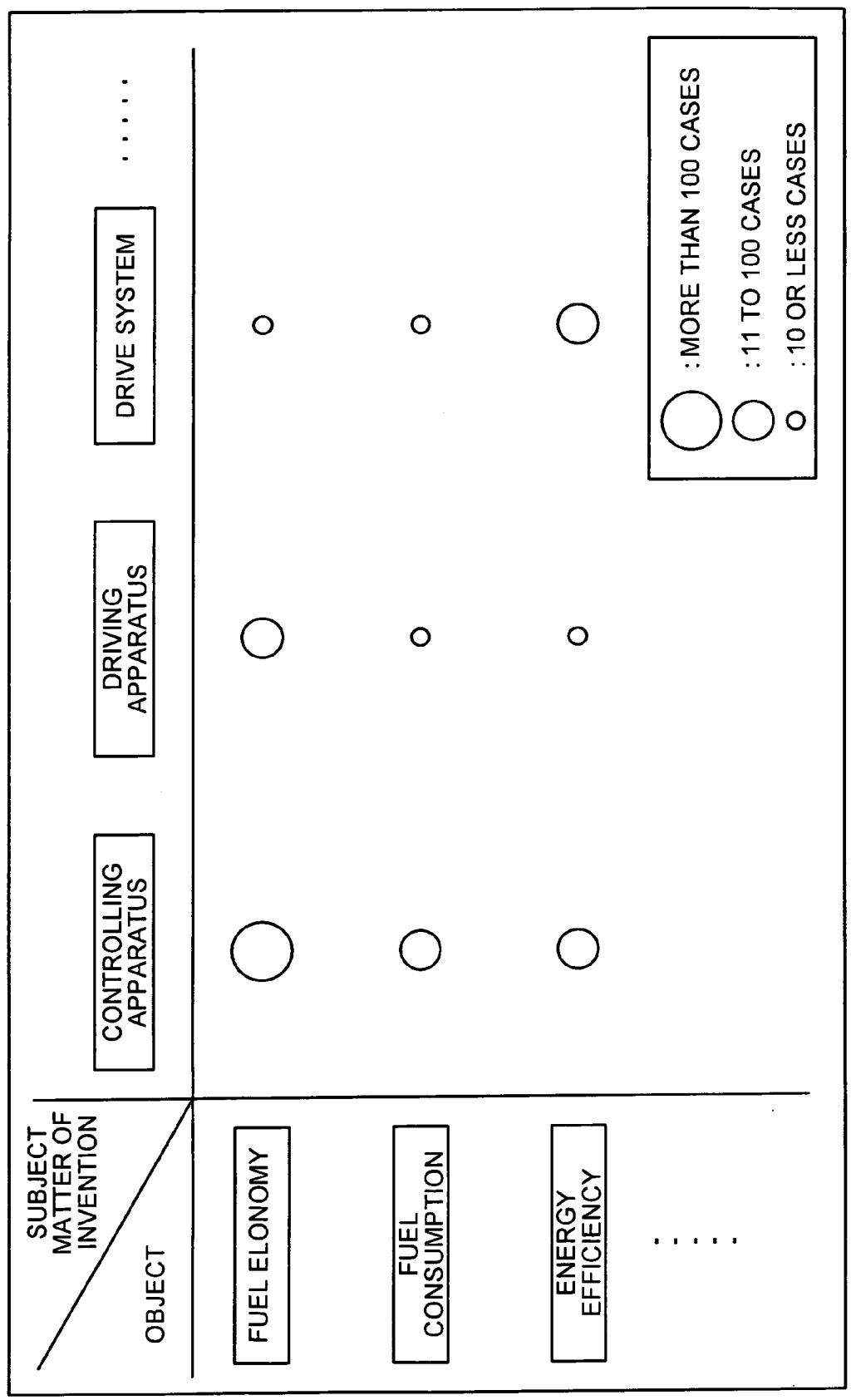

METHOD AND APPARATUS FOR EXTRACTING FEATURE INFORMATION, AND COMPUTER PRODUCT

CROSS-REFERENCE TO RELATED APPLICATIONS

This application is based upon and claims the benefit of priority from the prior Japanese Patent Application No. 2004-141985, filed on May 12, 2004, the entire contents of which are incorporated herein by reference.

BACKGROUND OF THE INVENTION

1. Field of the Invention

The present invention relates to a technology for extracting feature information from an electronic document.

2. Description of the Related Art

With large-capacity and cheap storage media and a rapid spread of an intranet and the Internet, it is possible to easily gather and store a large amount of electronic documents using a computer. Because a vast amount of information is available, when a user intends to acquire certain information from the electronic documents, an analysis tool that can output, according to the user's need, for example, relationship between character strings (hereinafter, "feature information"), such as keywords (words and compound words) and phrases that represent a feature of a document, and classification results based on frequency of occurrence of the feature information is indispensable.

However, a viewpoint in analyzing the information varies depending on a purpose, and the feature information also varies depending on the viewpoint. For example, when one tries to create a table shown in FIG. 9 by classifying or grouping a large amount of patent publications for a purpose of analyzing a recent technical trend in a field of hybrid electric vehicles, a keyword to be a reference for associating documents is different depending on the viewpoint. From a viewpoint of a subject matter of the invention (subject matter shown in FIG. 9), key words such as "CONTROLLING APPARATUS" and "DRIVING APPARATUS" may become the reference. From a viewpoint in which what kind of problem is to be solved by the invention (object shown in FIG. 9), key words such as "FUEL COST" and "FUEL CONSUMPTION" may become the reference.

In this regard, technologies to extract important character strings in the document and character strings to be a key in a specific viewpoint as the feature information have already been disclosed in, for example, Japanese Patent Application Laid-Open Publication No. H11-250097 and Japanese Patent Application Laid-Open Publication No. 2001-101199.

However, in the conventional technologies, if extraction rules are made stricter to improve an accuracy in extraction of the feature information, an extraction rate declines (i.e. information missed to be extracted increases), and if the extraction rules are relaxed to improve the extraction rate, the accuracy in the extraction declines (i.e. useless information increases).

For example, in a patent publication, if a part " . . . " in "RELATED TO . . . " is extracted as the feature information from the viewpoint of the subject matter of the invention, and if a part " . . . " in "TO IMPROVE . . . " is extracted as the feature information from the viewpoint of an object, from both the viewpoints, there is a chance in which a key word "ENGINE" is extracted as the feature information. If a part " . . . " in "TO IMPROVE . . . PROPERTY" instead of in "TO IMPROVE . . . ", is extracted as the feature information so that "ENGINE" is not extracted from a target viewpoint, a word "EFFICIENCY" can not be picked up as the feature information from the target viewpoint from a phrase "TO IMPROVE EFFICIENCY".

In the conventional technology, such a trade off has not been taken into consideration. Therefore, if an independency of each of the viewpoints is guaranteed (a plurality of viewpoints are not allowed to have the same feature information), the extraction rate is sacrificed.

SUMMARY OF THE INVENTION

It is an object of the present invention to solve at least the above problems in the conventional technology.

An apparatus for extracting feature information according to one aspect of the present invention includes an extracting unit that extracts feature information from each of the electronic documents for each of the viewpoints; a calculating unit that calculates a score for each of the viewpoints with respect to the feature information that is extracted from more than one viewpoint; and a determining unit that determines the viewpoint for the feature information that is extracted from more than one viewpoint, based on the score calculated.

A method for extracting feature information according to another aspect of the present invention includes extracting feature information from each of the electronic documents for each of the viewpoints; calculating a score for each of the viewpoints with respect to the feature information that is extracted from more than one viewpoint; and determining the viewpoint for the feature information that is extracted from more than one viewpoint, based on the score calculated.

A computer program for extracting feature information according to still another aspect of the present invention realizes the method according to the above aspect on a computer.

A computer readable recording medium according to still another aspect of the present invention stores a computer program for extracting feature information according to the above aspect.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1 is a schematic of an apparatus for extracting feature information according to an embodiment of the present invention;

FIG. 2 is a block diagram of the apparatus according to the embodiment;

FIG. 3 is a table of an example of extraction rules that are stored in an extraction-rule storage unit 203;

FIG. 4 is a table of a result of extraction of feature information by a feature-information extractor 204;

FIG. 5 is a table of an example of revision of the result of extraction shown in FIG. 4 in a case of deletion;

FIG. 6 is a table of an example of revision of the result of extraction shown in FIG. 4 in a case of changing a viewpoint;

FIG. 9 is a schematic of an example of a classification result of patent publications based on each viewpoint.

DETAILED DESCRIPTION

Figure 7:
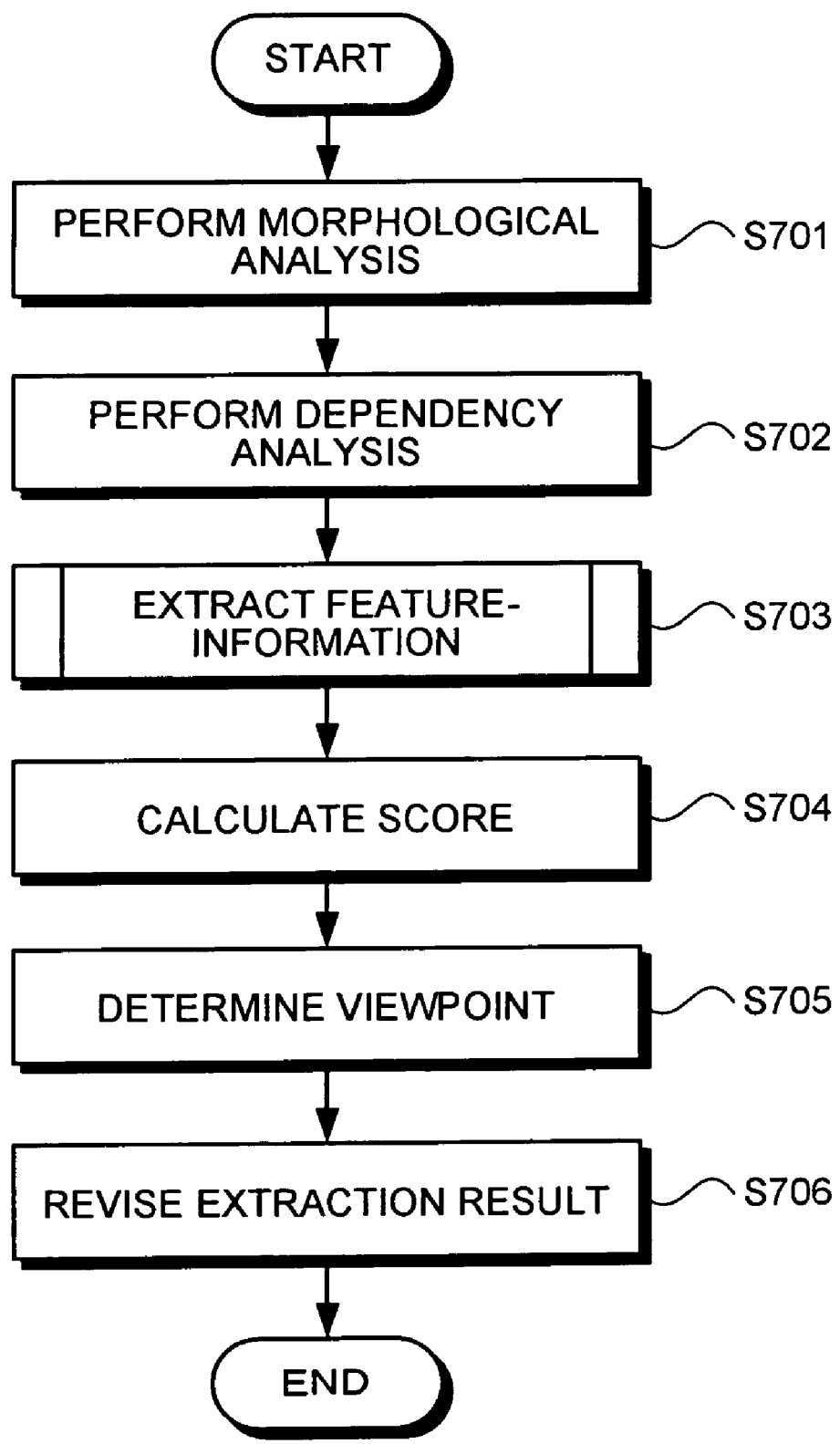
FIG. 7 is a flowchart of a feature-information extraction process in the apparatus according the embodiment.

Exemplary embodiments of a method and an apparatus for extracting feature information, and a computer product according to the present invention is described below in detail with reference to the accompanying drawings.

FIG. 1 is a schematic of a configuration of an apparatus for extracting feature information according to an embodiment of the present invention. A central processing unit (CPU) 101 controls the apparatus. A read only memory (ROM) 102 stores computer programs such as a boot program. A random access memory (RAM) 103 is used as a work area of the CPU 101.

A hard disk drive (HDD) 104 controls reading/writing of data from/to a hard disk (HD) 105 based on a control of the CPU 101. The HD 105 stores data that is written in accordance with the control of the HDD 104. A flexible disk drive (FDD) 106 controls reading/writing of data from/to the FD 107 based on the control of the CPU 101. The FD 107 stores data that is written by the control of the FDD 106. The FD 107 is an example of a removable recording medium. Instead of the FD 107, a compact disc-read only memory (CD-ROM), a compact disc-readable (CD-R), a compact disc-rewritable (CD-RW), a magneto-optical disc (MO), a digital versatile disc (DVD), and a memory card may also be used as the removable recording medium.

A display 108 displays a curser, a window, an icon, as well as data such as documents and images. A network I/F 109 is connected to a network such as a local area network (LAN) or a wide area network (WAN) and controls transmission and reception of data between the network and the apparatus. A key board 110 includes a plurality of keys for inputting characters, numbers, and various instructions and inputs data corresponding to the keys that are pressed, into the apparatus. A mouse 111 inputs an amount and a direction of rotation of a ball, which is arranged at a bottom of the mouse 111, into the apparatus, as well as ON/OFF operation of buttons, which are arranged on an upper portion of the mouse 111. Each of components is connected through a bus 100.

FIG. 2 is a block diagram of the apparatus according to the embodiment. As shown in FIG. 2, the apparatus includes a document storage unit 200, a morphological analyzing 201, a dependency analyzing unit 202, an extraction-rule storage unit 203, a feature-information extracting unit 204, a viewpoint determining unit 205, and an extraction-result revising unit 206.

The document storage unit 200 stores a plurality of electronic documents that are subjected to processing (hereinafter, "target documents"). While patent publications related to a hybrid electric vehicle are used as an example of the target documents, the target documents may not necessarily be the patent publications.

The morphological analyzing unit 201 performs morphological analysis for each of the electronic documents stored in the document storage unit 200. The dependency analyzing unit 202 performs dependency analysis based on a result of the morphological analysis by the morphological analyzing unit 201. The morphological analysis and the dependency analysis being widely known are not described in detail.

The extraction-rule storage unit 203 stores rules (hereinafter, "extraction rules") for the extraction of the feature information from the target document by the feature-information extracting unit 204.

FIG. 3 is a table of an example of extraction rules that are stored in an extraction-rule storage unit 203. The extraction rules prescribe which character string in the target document is to be extracted as feature information of which viewpoint. In other words, the extraction rules prescribe necessary conditions of the character strings to be regarded as the feature information of the target document in a particular viewpoint.

For example, a rule at the top in FIG. 3 prescribes that when there is a character string "RELATED TO" in an item "FIELD OF THE INVENTION", a character string that is situated after the character string "RELATED TO" (in strict terms, a character string related to the character string "RELATED TO") has to be extracted as the feature information in a viewpoint "SUBJECT MATTER OF THE INVENTION". Besides the rule to extract a dependency source of a specified character string in a certain range in a document, there is a rule to extract a dependency destination of the specified character string (for example a character string before "EASILY") or a rule to extract a character string that includes the specified character string (for example character strings starting with "APPARATUS FOR" or "METHOD OF").

While in FIG. 3, only "SUBJECT MATTER OF THE INVENTION" and "OBJECT" are shown as viewpoints, "COMPONENTS", "APPLICATIONS", "TYPES", "MATTER TO BE PROCESSED (OF SOFTWARE)" and "MEANS TO SOLVE THE PROBLEMS" may be considered as other viewpoints.

Referring to FIG. 2 again, the feature-information extracting unit 204 compares the result of the dependency analysis and the extraction rules, and extracts the feature information corresponding to each of the viewpoints from each of the target documents.

The target documents are the patent publications in the present embodiment. For example, a statement "THE PRESENT INVENTION RELATES TO A HYBRID ELECTRIC VEHICLE THAT . . . " is included in an item "FIELD OF THE INVENTION" in a document A. In the extraction rule in FIG. 3, the character string dependent on the character string "RELATED TO" in the item "FIELD OF THE INVENTION" is regarded as the feature information of a document from the viewpoint "SUBJECT MATTER OF THE INVENTION". The feature-information extracting unit 204 extracts "HYBRID ELECTRIC VEHICLE" as the feature information from the viewpoint "SUBJECT MATTER OF THE INVENTION" of the document A.

Thus, the feature information to be extracted is not necessarily a word and may be a compound word in which a dependency source on which the dependency source of the specified character string is further dependent, or a dependency destination to which the dependency destination of the specified character string is further dependent are combined. In such a case, a compound word is easy to treat, can be created by making an order of words, which are included in the compound word, different from an order of appearance in the document. Furthermore, post-treatments, such as deleting postpositional particles, or setting to regard, for example, "COMFORT OF RIDE" and "RIDE COMFORT" as a character string that has a same meaning, may be performed.

Moreover, for example, a statement "IT IS AN OBJECT OF THE PRESENT INVENTION TO IMPROVE A FUEL COST AND . . . " is included in an item "PROBLEMS TO BE SOLVED BY THE INVENTION" in the document A. In the extraction rule in FIG. 3, "FUEL COST" dependent on "IMPROVEMENT" is extracted as the feature information in the viewpoint "OBJECT" in the document A. Thus, the feature information (if there is any) is extracted from the target document according to each of the viewpoints, such as "SUBJECT MATTER OF THE INVENTION" and "OBJECT".

There are cases in which a relation between the viewpoint and the feature information is many-to-many relation, not one-to-many relation. In other words, for example, a character string "ASSEMBLING EFFICIENCY" may be used as in a phrase "THE PRESENT INVENTION IS RELATED TO AN ASSEMBLING EFFICIENCY . . . " in the item "FIELD OF THE INVENTION", and may be used as in a phrase "IT IS AN OBJECT OF THE PRESENT INVENTION TO IMPROVE AN ASSEMBLING EFFICIENCY OF . . . " in the item "PROBLEMS TO BE SOLVED BY THE INVENTION". Therefore, the character string can be extracted as the feature information in the extraction from both the viewpoints "SUBJECT MATTER OF THE INVENTION" and "OBJECT". In such a case, the plurality of viewpoints shares the feature information, and the independency of the viewpoint is not maintained.

In the embodiment of the present invention, when character strings that is denoted identically are extracted as the feature information from more than one viewpoint, the viewpoint determining unit 205 calculates a score of the character strings for each of the viewpoints, and the character string is regarded as the feature information of one of the viewpoints of which the score is highest. For example, if a score of "ASSEMBLING EFFICIENCY" in the viewpoint "SUBJECT MATTER OF THE INVENTION"<a score of "ASSEMBLING EFFICIENCY" in the viewpoint "OBJECT", the "ASSEMBLING EFFICIENCY" is regarded as the feature information in the viewpoint "OBJECT") exclusively. Thus, single feature information always belongs to a single viewpoint, and the independency of the viewpoint can be maintained.

A score of a certain character string in a certain viewpoint is calculated in a simple way by using a relation "score=number of documents from which that character string is extracted from that viewpoint". For example, if "ASSEMBLING EFFICIENCY" is extracted as the feature information from the viewpoint "SUBJECT MATTER OF THE INVENTION" from two documents from among the target documents and as the feature information of the viewpoint "OBJECT" from twelve documents respectively, the score of "ASSEMBLING EFFICIENCY" in the viewpoint "SUBJECT MATTER OF THE INVENTION" is 2 and the score in the view point "OBJECT" is 12. In the present embodiment, the scores are modified using a weight (refer to FIG. 3) that is given for each of the rules and that is a basis for the extraction, the score has a relation such as score=weighted sum of frequency of extraction of that character string from that viewpoint. The weight is set in advance corresponding to a factor such as accuracy.

For example, a character string "ASSEMBLING EFFICIENCY" is extracted in the whole group of the target document in three different ways: as a dependency source of a character string "RELATED TO" in an item "FIELD OF THE INVENTION"—once; as a dependency source of a character string "ACCORDING TO" in the item "FIELD OF THE INVENTION"—once; and as a dependency source of a character string "IMPROVEMENT IN" in an item "PROBLEMS TO BE SOLVED BY THE INVENTION"—six times.

In this case, the score of "ASSEMBLING EFFICIENCY" in the viewpoint "SUBJECT MATTER OF THE INVENTION" is 2 (score=extracted once as the dependency source of "RELATED TO"×weight 1+extracted once as the dependency source of "ACCORDING TO"×weight 1), and the score in the viewpoint "OBJECT" is 12 (score=extracted six times as the dependency source of "IMPROVEMENT IN"×weight 2). As a result, the character string "ASSEMBLING EFFICIENCY" is regarded as the feature information of a document in the viewpoint "OBJECT" rather than in the viewpoint "SUBJECT MATTER OF THE INVENTION".

Instead of using the viewpoint, of which the score is highest, by simply comparing the scores, a viewpoint of which the score is by far very high (when a difference between the scores is greater than a predetermined value or greater than a predetermined ratio) may also be used as the viewpoint. Moreover, instead of using only the viewpoint with the highest score, all viewpoints of which the score is greater than a predetermined value may also be used. For example, character strings such as "PROPERTY OF . . . " and "RATE OF . . . " is used frequently in a context of an object of the invention statistically and historically. Therefore, for such character strings that have certain features, as the character strings "PROPERTY OF . . . " and "RATE OF . . . ", a particular viewpoint (for example "OBJECT") may be used setting priority.

Referring to FIG. 2 again, the extraction-result revising unit 206 revises the extraction result according to viewpoints that are narrowed by choosing the viewpoints by the viewpoint determining unit 205. In other words, if a character string "ASSEMBLING EFFICIENCY" is extracted as the feature information of the viewpoint "OBJECT" in a process by the viewpoint determining unit 205, for a document from which the character string "ASSEMBLING EFFICIENCY" is extracted as the feature information of the viewpoint "SUBJECT MATTER OF THE INVENTION", the feature information is deleted or the viewpoint is changed as a process of revision.

FIG. 4 is a table of a result of extraction of feature information by the feature-information extracting unit 204. In the extraction result shown, feature information extracted from each of documents is gathered according to each of viewpoints. A character string "ASSEMBLING EFFICIENCY" is extracted from the viewpoint "OBJECT" in document A, but extracted from the viewpoint "SUBJECT MATTER OF THE INVENTION" in document B. Therefore, the extraction-result revising unit 206 deletes "ASSEMBLING EFFICIENCY" in document B as shown in FIG. 5, or changes to the viewpoint "OBJECT" as shown in FIG. 6.

FIG. 7 is flowchart of a feature-information extraction process in the apparatus according the embodiment of the present invention. In the apparatus, the morphological analyzing unit 201 performs morphological analysis (step S701) and the dependency analyzing unit 202 performs dependency analysis (step S702) of a target document in the document storage unit 200. In the feature-information extracting unit 204, dependency sets in the analysis result and the extraction rules (FIG. 3) are compared in the extraction-rule storage unit 203, and the feature information of each of the documents in each of the viewpoints is extracted (step S703).

Figure 8:
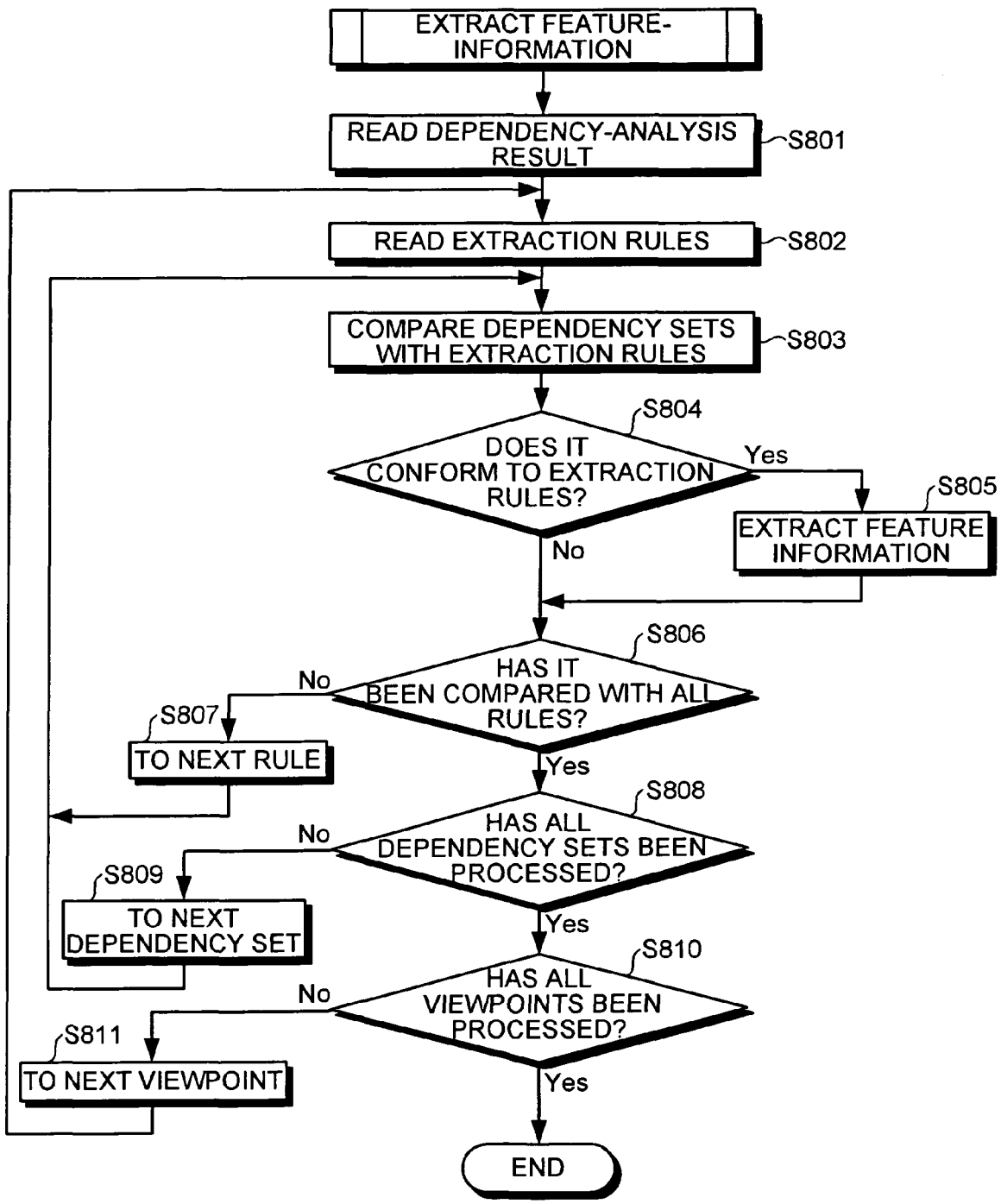
FIG. 8 is a flowchart of a procedure at step 703 in FIG. 7.

FIG. 8 is a flowchart of a procedure at step 703 in FIG. 7. First, the feature-information extracting unit 204 reads the result of the dependency analysis performed by the dependency analyzing unit 202 (step S801) and reads all extraction rules for extracting feature information of a specific viewpoint such as "SUBJECT MATTER OF THE INVENTION" from the extraction-rule storage unit 203 (five rules in total in FIG. 3) (step S802).

One of the dependency set from the result of the dependency analysis read at step S801 and an extraction rule read at step S802 are compared (step S803). If the dependency set conforms to the rule ("YES" at step S804), a character string that is specified as a target character string in the rule is extracted as the feature information (step S805). If the dependency set does not conform to the target extraction rule ("NO" at step S804), the process proceeds to the next step.

Then, it is determined whether the target dependency set has been compared with all the extraction rules read at step S802. If there is any rule that has not been compared with the dependency group ("NO" at step S806), the target extraction rule is changed to a next rule (step S807), and then, steps S803 to S806 are repeated.

On the other hand, if the target dependency set has been compared with all the extraction rules of a certain viewpoint ("YES" at step S806), it is determined whether all target dependency set in the analysis result read at step S801 have been compared with the extraction rules. If there is any dependency set that have not been compared with the extraction rules ("NO" at step S808), the target dependency set is changed to a next dependency set (step S809), and then, steps S803 to S808 are repeated.

On the other hand, all the target dependency sets have been compared with the extraction rules ("YES" at step S808), it is determined whether the processes in steps S802 to S809 have been completed for each of the viewpoints in the extraction-rule storage unit 203. If there is any viewpoint that has not been processed ("NO" at step S810), the target viewpoint is changed to one of the viewpoints, which has not been processed, such as "OBJECT" (step S811), and then steps S802 to S810 are repeated. When the processes have completed for all the viewpoints ("YES" at step S810), the process in the flowchart shown in FIG. 8 is completed, and the process proceeds to step S704 in FIG. 7.

Referring to FIG. 7 again, when the extraction of the feature information for all the target documents according to the procedure in FIG. 8 is completed, the viewpoint determining unit 205 calculates the score for each of the feature information extracted in each of the viewpoints (step S704). A viewpoint of which the score is highest is determined as the viewpoint of the feature information (determining the viewpoint) (step S705) and the feature information that is extracted from a viewpoint other than the viewpoint determined is deleted or that viewpoint is changed to the viewpoint that is determined (revising extraction result) (step S706).

According to the present embodiment, even if the same character string is extracted as the feature information from a plurality of viewpoints, only a viewpoint that is relatively probable considering factors such as extraction frequency is left to remain. Therefore, the feature information can be extracted over a wide range with comparatively relaxed rules, and each of the feature information can be distributed to an ideal viewpoint. In other words, an accuracy of extraction as well as a rate of extraction can be improved.

The method of extracting feature information described in the embodiment can be realized by executing a computer program that is prepared in advance in a computer such as a personal computer and a work station. This computer program is recorded in a computer readable recording medium such as the hard disk 105, the flexible disk 107, the CD-ROM, the MO, and the DVD and is executed by the computer by reading from the recording medium. This computer program may also be a transmission medium that can be distributed through a network such as the Internet.

According to the present invention, it is possible to provide a method and an apparatus for extracting feature information and a computer program for extracting feature information that enable to extract the feature information, such as a keyword accurately and exhaustively that characterizes contents of electronic documents as well as to guarantee the independency of each viewpoint.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for extracting feature information from a plurality of electronic documents, comprising:
    an extracting unit that performs, using different extraction rules on the same group of electronic documents, a first extraction and a second extraction so as to extract feature information from each of the same group of the electronic documents;
    a calculating unit that calculates a first score and a second score of the feature information with respect to the first extraction and the second extraction, respectively; and
    a selecting unit that selects, based on the first score and the second score either one of the first extraction or the second extraction to be associated with the feature information,
    wherein each of the rules is one of extracting a dependency source of a specified character string, extracting a dependency destination of the specified character string, and extracting a character string that combines the specified character string and another character string.

2. The apparatus according to claim 1, wherein at least one of the first score and the second score is calculated based on a frequency in which the feature information extracted is extracted from the documents.

3. The apparatus according to claim 1, wherein the selecting unit selects the greater of the first and second scores as the score for the feature information.

4. The apparatus according to claim 1, further comprising a deleting unit that deletes the feature information associated with the extraction that was not selected by the selecting unit.

5. The apparatus according to claim 1, further comprising a changing unit that changes the feature information associated with the extraction that was not selected by the selecting unit into feature information for the extraction that was selected by the selecting unit.

6. A method for extracting feature information from a plurality of electronic documents, comprising:
    performing a first extraction to extract feature information from the electronic documents;
    performing a second extraction to extract feature information from the electronic documents, where said second extraction uses a different extraction rule than said first extraction, but where said second extraction and said first extraction are both performed on each of the electronic documents of the same group of electronic documents;
    calculating a first score and a second score of the feature information with respect to the first extraction and second extraction respectively; and
    selecting, based on the first score and the second score, either one of the first extraction or the second extraction to be associated with the feature information,
    wherein each of the rules is one of extracting a dependency source of a specified character string, extracting a dependency destination of the specified character string, and extracting a character string that combines the specified character string and another character string.

7. The method according to claim 6, wherein at least one of the first score and the second score is calculated based on a frequency in which the feature information extracted is extracted from the documents.

8. The method according to claim 6, wherein the selecting includes selecting the greater of the first and second scores as the score for the feature information.

9. The method according to claim 6, further comprising deleting the feature information associated with the extraction that was not selected during the selecting step.

10. The method according to claim 6, further comprising changing the feature information associated with the extraction that was not selected during the selecting step into feature information for the extraction that was selected during the selecting step.

11. A computer readable recording medium that stores a computer program for extracting feature information from a plurality of electronic documents, the computer program making a computer execute:
- performing a first extraction to extract feature information from the electronic documents;
- performing a second extraction to extract feature information from each electronic document of the same group of electronic documents upon which said first extraction was performed, where said second extraction uses a different extraction rule than said first extraction;
- calculating a first score and a second score of the feature information with respect to the first extraction and second extraction respectively; and
- selecting, based on the first score and the second score, either one of the first extraction or the second extraction to be associated with the feature information,
- wherein each of the rules is one of extracting a dependency source of a specified character string, extracting a dependency destination of the specified character string, and extracting a character string that combines the specified character string and another character string.

12. The computer readable recording medium according to claim 11, wherein at least one of the first score and the second score is calculating based on a frequency in which the feature information extracted is extracted from the documents.

13. The computer readable recording medium according to claim 11, wherein the selecting includes selecting the greater of the first and second scores as the score for the feature information.

14. The computer readable recording medium according to claim 11, wherein the computer program further makes the computer execute deleting the feature information associated with the extraction that was not selected during the selecting step.

15. The computer readable recording medium according to claim 11, wherein the computer program further makes the computer execute changing the feature information associated with the extraction that was not selected during the selecting step into feature information for the extraction that was selected during the selecting step.

16. An apparatus that analyzes a group of electronic documents, comprising:
- an extracting unit that performs, using different extraction rules on the same group of electronic documents, a first extraction and a second extraction so as to extract feature information from each document of the same group of electronic documents;
- a calculating unit that calculates a first score and a second score for the feature information with respect to the first extraction and the second extraction, respectively; and
- a selecting unit that selects, based on the first and second scores, one of the first and second extractions from which the feature information is to be extracted from the group of electronic documents,
- wherein each of the rules is one of extracting a dependency source of a specified character string, extracting a dependency destination of the specified character string, and extracting a character string that combines the specified character string and another character string.

* * * * *